(12) United States Patent
Hirayama et al.

(10) Patent No.: US 6,658,257 B1
(45) Date of Patent: Dec. 2, 2003

(54) RADIO COMMUNICATION SYSTEM, FREQUENCY ALLOCATION METHOD AND FREQUENCY ALLOCATION DEVICE

(75) Inventors: Tomoaki Hirayama, Kanagawa (JP); Tadao Takami, Kanagawa (JP); Kiyohito Nagata, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/446,295

(22) PCT Filed: May 7, 1999

(86) PCT No.: PCT/JP99/02375

§ 371 (c)(1), (2), (4) Date: Dec. 17, 1999

(87) PCT Pub. No.: WO99/59362

PCT Pub. Date: Nov. 18, 1999

(30) Foreign Application Priority Data

May 8, 1998 (JP) .......................................... 10-126286

(51) Int. Cl.[7] .................................................. H04Q 7/20
(52) U.S. Cl. ...................... 455/451; 455/450; 455/452.1
(58) Field of Search ................................ 455/450, 447, 455/446, 449, 451, 452, 464, 422, 522; 370/329, 328, 334, 347, 341, 330, 342

(56) References Cited

U.S. PATENT DOCUMENTS

| | | | | |
|---|---|---|---|---|
| 5,708,969 A | * | 1/1998 | Kotzin et al. ............... | 455/423 |
| 5,787,352 A | * | 7/1998 | Benveniste ................. | 455/452 |
| 5,818,827 A | | 10/1998 | Usui et al. | |
| 5,857,154 A | * | 1/1999 | Laborde et al. ............. | 455/444 |
| 5,924,036 A | * | 7/1999 | Gustafson ................... | 455/447 |
| 5,926,763 A | * | 7/1999 | Greene et al. .............. | 455/450 |
| 6,061,568 A | * | 5/2000 | Dent ........................... | 455/450 |
| 6,219,541 B1 | * | 4/2001 | Brodie ........................ | 455/422 |
| 6,259,685 B1 | * | 7/2001 | Rinne et al. ................ | 370/330 |
| 6,590,878 B1 | * | 7/2003 | Uchida et al. .............. | 370/330 |

FOREIGN PATENT DOCUMENTS

| | | |
|---|---|---|
| JP | 4-245723 A | 9/1992 |
| JP | 9-200843 A | 7/1997 |
| WO | WO 96/37082 A1 * 11/1996 | ............ H04Q/7/36 |

* cited by examiner

Primary Examiner—Charles Appiah
(74) Attorney, Agent, or Firm—Brinks Hofer Gilson & Lione

(57) ABSTRACT

Among cellular radio communication systems, there are those in which a plurality of businesses, e.g. businesses A, B and C share a designated frequency band, and each business provides radio communication services using respectively allotted frequency bands. In this type of radio communication system, there are cases in which mobile stations belonging to different businesses use channels which have adjacent frequencies, in which case adjacent channel interference of a large interference level is produced. Therefore, in this radio communication system, of the frequency bands allotted to each business, the adjacent frequency bands which are adjacent to frequency bands allotted to other businesses are allotted to low power communications, while non-adjacent frequency bands which are not adjacent to frequency bands allotted to other businesses are allotted to high power communications.

3 Claims, 15 Drawing Sheets

COMMUNICATION FREQUENCY OF BUSINESS A: A1, A2, A3, A4
COMMUNICATION FREQUENCY OF BUSINESS B : B1, B2, B3, B4
COMMUNICATION FREQUENCY OF BUSINESS C: C1, C2, C3, C4

$f_{ci}$: CENTRAL FREQUENCY OF COMMUNICATION
FREQUENCY BAND $B_i$: FREQUENCY INTERVAL

RADIO COMMUNICATION SYSTEM, FREQUENCY ALLOCATION METHOD AND FREQUENCY ALLOCATION DEVICE

TECHNICAL FIELD

The present invention relates to a radio communication system composed of the communication equipment of a plurality of different businesses, and a frequency allocation method and frequency allocation device therefor.

BACKGROUND ART

Cellular radio communication systems are generally used as mobile phone systems due to their ability to cover wide service areas. In these cellular radio communication systems, a plurality of base stations are arranged in a service area separately, and these base stations form a multitude of cells (zones) for covering the entire service area without gaps. In these cells, mobile stations can communicate with other parties by using base stations.

Businesses which offer this type of mobile communication system are preassigned specific frequency bands. In each cell of a radio communication system, communication is performed between the mobile stations and base stations by using communication channels in these frequency bands.

Recently, the CDMA (Code Division Multiple Access) system has received attention as a radio communication system between mobile stations and base stations. In such CDMA radio communication systems, mobile stations and base stations perform a spread spectrum process using spreading codes on the signals to be transmitted, and these spread signals are transmitted to the other party. Here, different spreading codes are assigned to a plurality of mobile stations which perform communications at the same time. Therefore, in CDMA radio communication systems, a plurality of mobile stations in the same cell or in a plurality of adjacent cells can use the same frequency for communicating radio signals with the base stations.

FIG. 7 shows an example of cell groups in a CDMA radio communication system. In this CDMA radio communication system, four kinds of frequency f1, f2, f3 and f4 are provided as communication frequencies for communications between the mobile stations and a base station in a cell. However, the use of these four communication frequencies does not necessarily have to be allowed in every cell. For example, it is possible to allow the use of the communication frequencies $f_1$–$f_4$ in places with heavy traffic such as in a city center, and to allow the use of only the communication frequency $f_1$ in places with light traffic such as in outlying areas, then sequentially add the available communication frequencies in the order of communication frequencies $f_2$, $f_3$ and $f_4$ as the need arises in response to increases in traffic.

FIG. 8 shows an example of a map of the system capacity in a case where the number of available communication frequencies in each cell is increased in going from the outlying areas toward the city center. In each cell, a plurality of communication channels in the same frequency band can be used by using spreading codes which differ by the mobile station, whereby large amounts of traffic can be handled. The amount of traffic capable of being handled at the same time, i.e. the system capacity of each cell, depends on the number of available frequencies in each cell. Therefore, if the required system capacity becomes larger in the city center and smaller in approaching the outlying areas, then the number of available communication frequencies in each cell should be made smaller in going from a city center toward outlying areas as shown in FIG. 8. In the example shown in FIG. 8, the same communication frequency f, can be used over the entire area. In this case, there is no need to switch the communication frequency being used due to movement between cells, and it is sufficient to switch the spreading codes, so that communication interruptions can be minimized.

FIG. 9 shows an example of a plurality of communication frequency bands in a specific frequency band allotted to a certain business in a CDMA radio communication system.

These communication frequency bands are arranged upon the frequency axis at frequency band gaps of $B_1$, $B_2$, ... The frequency band gaps $B_1$, $B_2$, ... can be the same value. The mobile stations and base mobile station exchange radio signals with other parties by using one of these communication frequency bands.

However, if for example non-linear distortion or the leakage occurs when a radio signal in a certain communication frequency band is amplified and output by a transmission power amplifier in a mobile station, a leakage signal will appear in the communication frequency band adjacent to that communication frequency band (hereafter referred to as adjacent frequency band).

As shown in FIG. 10, the power of leakage signal is usually strongest in the adjacent frequency bands, and becomes extremely weak in the next adjacent frequency bands.

Leakage signals with large powers influence reception operations of mobile stations and base stations using the adjacent frequency bands. Here, the mobile stations and base stations have reception filters for attenuating such leakage signals from adjacent frequency bands. However, unless the attenuation properties outside the bands of the reception filters are sufficient, the influence of interference from the adjacent frequency bands (hereafter referred to as adjacent channel interference) becomes large.

This adjacent channel interference causes reductions in the reception sensitivity and intermixture of noise in the mobile stations and base stations. For this reason, a guard band G is provided for suppressing adjacent channel interference between the communication frequency bands as shown in FIG. 11.

The width of this guard band G affects the system capacity of the radio communication system.

More particularly, the theoretical system capacity S can be obtained by the following formula (1).

$$S=C(W-KG)/D=CN \qquad \ldots (1)$$

In the above formula (1), C denotes the number of communication channels capable of using the same communication frequency band, W denotes the bandwidth of the entire frequency band allotted to a mobile communication service business, K denotes the number of guard bands provided in this frequency band, G denotes the bandwidth of each guard band, and N denotes the number of communication frequency bands.

As shown in FIG. 12, the system capacity S can be made larger if the guard band G is narrower because the number N of the communication frequency bands can be made larger. However, if the guard band B is narrow, then the amount of adjacent channel interference becomes large. Furthermore, if the guard band G are too narrow, then the use of communication channels which are influenced by adjacent channel interference is restricted, so that the system capacities will be conversely be reduced.

On the other hand, if the guard bands G are made wide as shown in FIG. 13, it is possible to keep the adjacent channel interference small. However, in this case, the system capacity S will be reduced.

In order to suppress the adjacent channel interference and retain the necessary system capacity, it is necessary to provide ways of suppressing adjacent channel interference without depending on only the method of widening the widths of the guard bands G.

For this reason, conventional cellular radio communication systems suppress adjacent channel interference by performing transmission power control to keep the transmission output of the transmission power amplifier circuits of the mobile stations and base stations as low as possible within a range such as to maintain the necessary communication quality.

For example, in FIG. 14, when a mobile station is near a base station and the quality of reception signals from the mobile station in the base station is high, then the transmission power of the mobile station is made low. On the other hand, if the mobile station is far from the base station and the quality of the reception signals from the mobile station in the base station is low, then the transmission power of the mobile station is made high.

There are cases in which a plurality of businesses provide mobile communication services in the same or overlapping service areas. In this case, the businesses share the use of the frequency bands offered for those services. FIGS. 15(a) and (b) show examples thereof. First, in the example shown in FIG. 15(a), the frequency band offered for a mobile communication service is divided into three parts, and the divided frequency bands are allotted respectively to the businesses A, B and C. Additionally, in the example shown in FIG. 15(b), a frequency band offered for a mobile communication service is shared by the businesses A and B. Each business provides communication services using the allotted frequency band.

Here, transmission power control is performed in the base stations and mobile stations adapted for each business, as a result of which the effects of adjacent channel interference are minimized.

However, when a plurality of businesses offer mobile communication services in an overlapping service area, there are cases in which adjacent channel interference of a considerable interference level occurs between different businesses and this cannot be sufficiently suppressed even if transmission power control is performed by both the base stations and mobile stations adapted to the respective businesses.

Herebelow, a typical example wherein the problem of adjacent channel interference between different businesses occurs shall be explained.

In FIG. 16, the base station 20A is a communication installation of business A, and the base station 20B is a communication installation of business B. Additionally, the cell 10A is a cell formed by base station 20A and the cell 10B is a cell formed by base station 20B. Furthermore, the mobile station 30A is a mobile station of a user contracted with business A and the mobile station 30B is a mobile station of a user contracted with business B.

As shown in FIG. 16, the base station 20A of business A is located at the edge of the cell 10B formed by the base station 20B of business B. When the base stations of different businesses have this type of geographical relationship, adjacent channel interference of a larger interference level than that which occurs within the same business can occur.

Suppose a case in which the mobile station 30B is in communication using a communication channel adjacent to a frequency band allotted to business A as shown in FIG. 16.

In this case, the mobile station 30B may transmit at maximum power in the vicinity of the base station 20A of business A in order to make the transmission signal reach the base station 20B which is far away.

At this time, the uplink transmission signal transmitted by the mobile station 30B includes, in addition to a signal corresponding to the uplink channel allotted to the mobile station 30B, a leakage signal in a channel adjacent to this uplink channel, i.e. in the communication channel used by the base station 20A of business A. This leakage signal interferes with base station 20A of business A. The mobile station 30A which is present in cell 10A must then increase the transmission power in order to compensate for decreases in the communication quality due to the effects of this interference.

If the mobile station 30A moves to the edge of cell 10A as shown in FIG. 16, the mobile station 30A must raise the transmission power in accordance with the distance to the base station 20A.

However, as shown in FIG. 16, if the mobile station 30A is far from the base station 20A and the mobile station 30B which is outputting a leakage signal which causes adjacent channel interference is located in the immediate vicinity of the base station 20A, adjacent channel interference of an extremely high level will influence the communications between the mobile station 30A and the base station 20A.

In this case, even if the transmission power of the mobile station 30A is at maximum, there is a possibility that the effects of the adjacent channel interference due to the leakage signals from the mobile station 30A will not be able to be reduced.

Generally speaking the number of both mobile stations and base stations is large. Additionally, the mobile stations in a service area move arbitrarily.

Therefore, decreases in the system capacity due to adjacent channel interference are manifested in increases in the proportion of parts of service areas in which a predetermined quality cannot be obtained or in increases in the proportion of time during which a predetermined quality cannot be obtained at the same location.

In order to gain the reliance of mobile communication service users, it is necessary to reduce the proportion of area or time during which this predetermined level of quality cannot be obtained.

DISCLOSURE OF THE INVENTION

The present invention has been achieved in view of the above-described considerations, and has the object of reducing the interference of leakage power generated between adjacent communication frequency bands of different businesses and to suppress large decreases in system capacity in cellular radio communication systems wherein specific frequency bands are allotted to a plurality of businesses.

In order to achieve the above object, the present invention provides a frequency allocation method in a cellular radio communication system in which a plurality of businesses are apportioned a predetermined frequency band and each business provides radio communication services using a frequency band apportioned thereto. In the frequency allocation method, within the frequency band apportioned to each business an adjacent frequency band adjacent to a frequency band allotted to another business is allotted to low power communications, and a non-adjacent frequency band which is not adjacent to a frequency band allotted to another business is allotted to high power communications.

According to the present invention, non-adjacent frequency bands which are not adjacent to frequency bands allotted to other businesses are allotted to high power communications and adjacent frequency bands adjacent to frequency bands allotted to other businesses are allotted to low power communications, so as to enable reductions in the interference due to leaked power in channels which are adjacent between one business and another.

BEST MODES FOR CARRYING OUT THE INVENTION

Herebelow, embodiments of the present invention shall be explained with reference to the drawings.

First Embodiment

Figure 1:
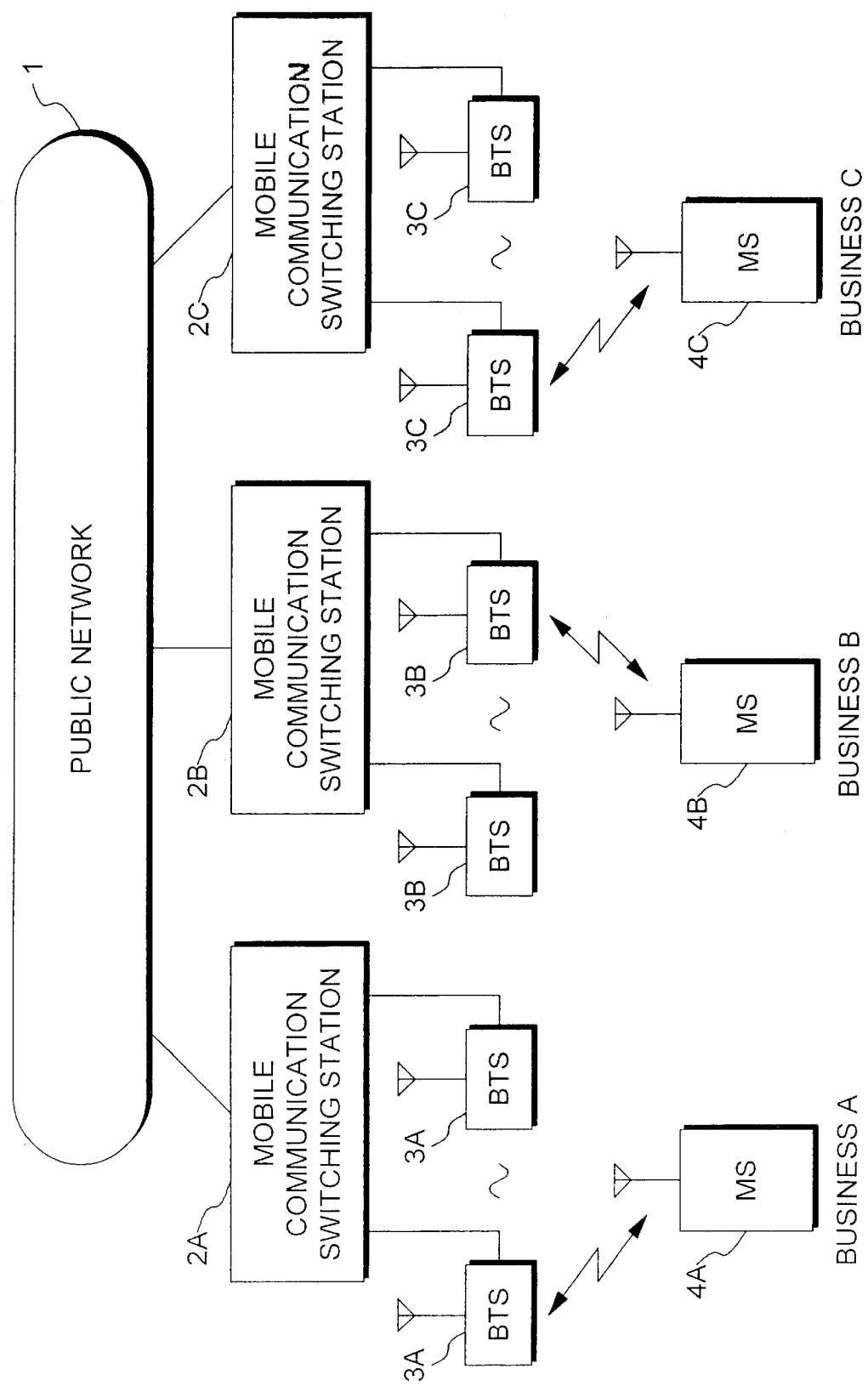
FIG. 1 is a diagram showing the structure of a radio communication system according to a first embodiment of the present invention.

FIG. 1 is a diagram showing the structure of a radio communication system according to a first embodiment of the present invention. In this radio communication system, businesses A, B and C offer mobile communication services. Additionally, this radio communication system is a CDMA (Code Division Multiple Access) mobile communication system.

In FIG. 1, mobile communication switching station 2A and base station 3A are communication installations for business A, mobile communication switching station 2B and base station 3B are communication installations for business B and communication switching station 2C and base station 3C are communication installations for business C. Although each business has many base stations and mobile communication switching stations aside from those shown in the drawings, these are not shown in the drawings in order to prevent the drawings from becoming overcrowded.

Additionally, in FIG. 1, mobile station 4A is the mobile station of a user contracted with business A, mobile station 4B is the mobile station of a user contracted with business B and mobile station C is the mobile station of a user contracted with business C. The user contracted with business A can perform communications with other parties using with the communication installations of business A and with the mobile station A. The same is true of the users contracting with businesses B and C, and they can communicate with other parties using with the communication installations of the businesses with which they are contracted.

The service areas of the businesses mutually overlap. Each business has the above-mentioned base stations spread thoroughly over the respective service areas in order to offer mobile communication services. For this reason, there are cases in which the base stations of respective businesses are positioned close together, so that the cells corresponding to base stations of different businesses overlap. For this reason, the problem of adjacent channel interference between different businesses will occur unless some countermeasure is taken. Therefore, in the communication installations and mobile stations corresponding to each business in the present embodiment, communication frequency bands adjacent to frequency bands allotted to other businesses are allotted to low power communications, and other communication frequency bands (except them) are allotted to high power communications.

This frequency allocation method can be explained as follows with reference to FIG. 2.

Figure 2:
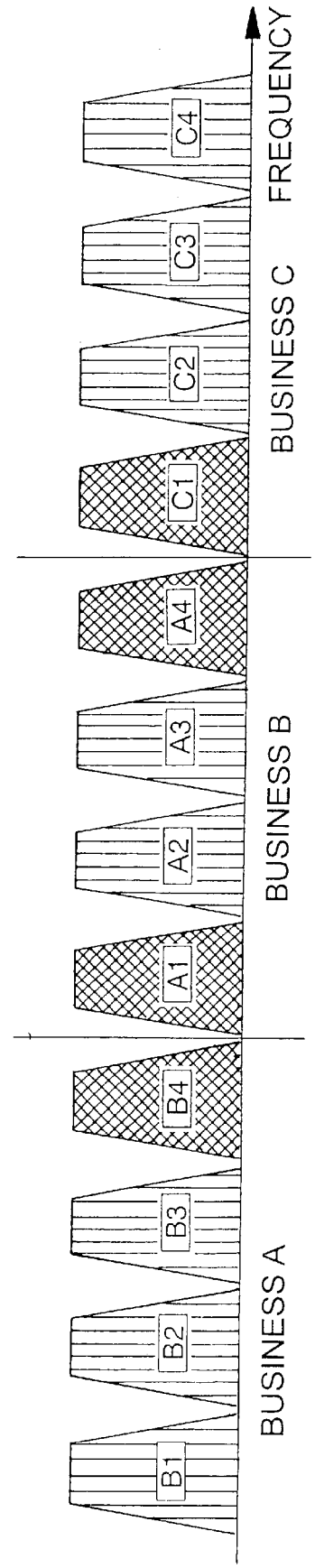
FIG. 2 is a diagram showing a frequency allocation method according to the same embodiment.

In the example shown in FIG. 2, communication frequency bands A1, A2, A3 and A4 are among the frequency bands allotted to business A. In the cells corresponding to business A, any of the communication frequency bands A1, A2, A3 and A4 can be selected for use as communication channels for communications between the base stations and mobile stations. Additionally, in each cell, it is possible to simultaneously perform radio communications using the same communication frequency band by having a plurality of mobile stations use different spreading codes.

Here, the communication frequency band Al which has the lowest frequency among communication frequency bands A1, A2, A3 and A4 is adjacent to the communication frequency band B4 of business B, and the communication frequency band A4 with the highest frequency is adjacent to the communication frequency band C1 of business C. Hereafter, these communication frequency bands are called adjacent frequency bands for the sake of convenience.

In the radio communication system according to the present embodiment, these adjacent frequency bands A1 and A4 are favored for allocation to low power communications.

On the other hand, the communication frequency bands A2 and A3 are far from the frequency bands of the other businesses B and C. Hereafter, these communication frequency bands are called non-adjacent frequency bands for the sake of convenience.

In the radio communication system according to the present embodiment, these nonadjacent frequency bands A2 and A3 are favored for allocation to high power communications.

The cells corresponding to the other businesses B and C are treated likewise. That is, in the cells corresponding to business B, the adjacent frequency band B4 is favored for allocation to low power communications, while the non-adjacent frequency bands B1, B2 and B3 are favored for allocation to high power communications. Additionally in the cells corresponding to business C, the adjacent frequency band C1 is favored for allocation to low power communications and the non-adjacent frequency bands C2, C3 and C4 are favored for allocation to high power communications.

Since the frequencies are allotted by this method in the cells corresponding to each business in the present embodiment, the transmission power will be low when an adjacent frequency band which lies adjacent to that of another business is used for communications.

Figure 16:
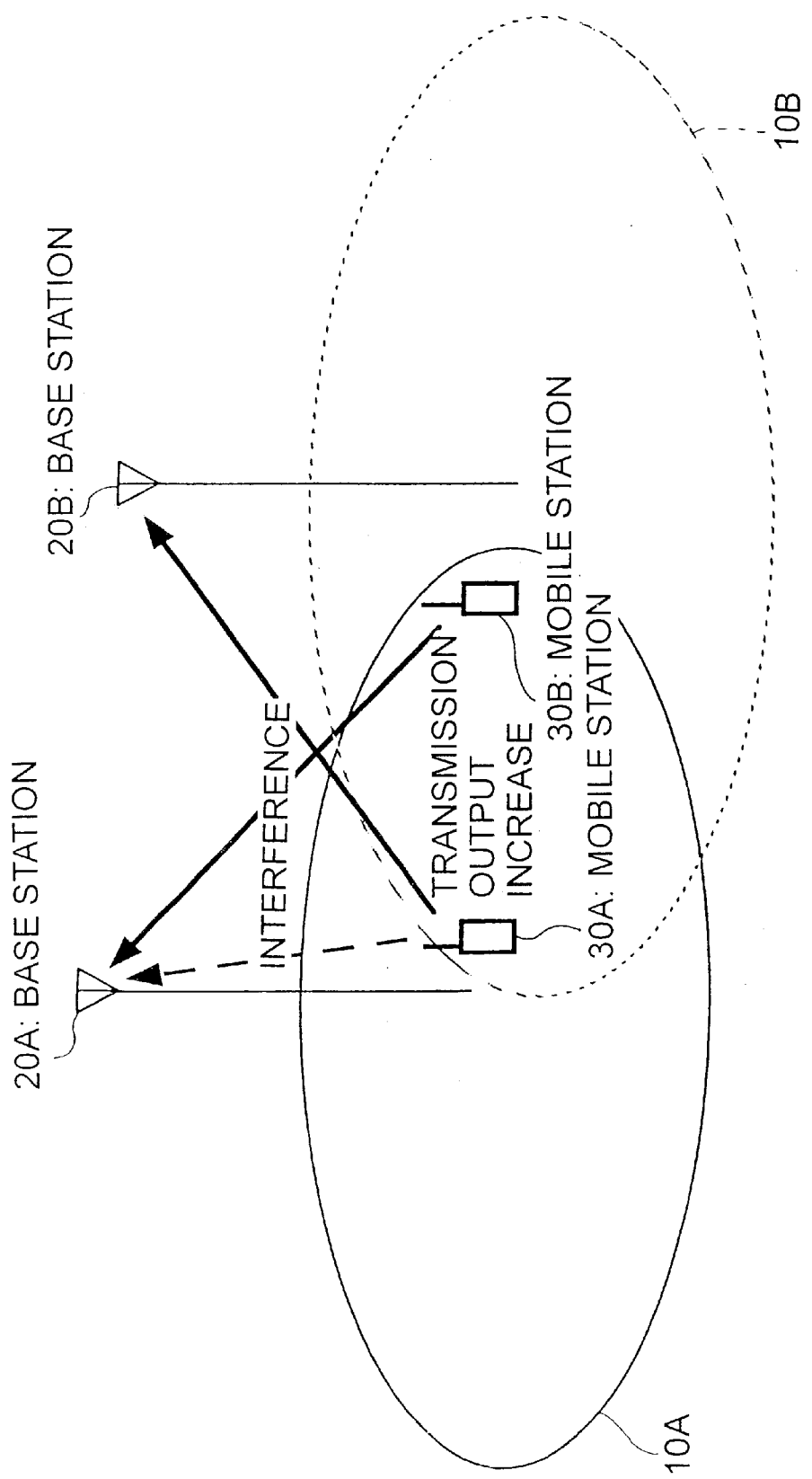
FIG. 16 is a diagram for explaining adjacent channel interference which occurs between two mobile stations belonging to different businesses.

For this reason, if for example, the base stations corresponding to businesses A and B and two mobile stations which are performing radio communications with the base stations are in the situation shown in the above-mentioned FIG. 16, and the two mobile stations are communicating respectively on the adjacent frequency bands A1 and B4, the level of interference due to adjacent channel interference can be held low because the transmission powers of these communications performed by each mobile station will be low. Additionally, while control is performed to increase the transmission power of each mobile station if the adjacent channel interference is high, the transmission output of each mobile station is originally low, so that the amount of increase of the transmission power can be made large, so as to effectively prevent the effects on quality caused by adjacent channel interference generated between different businesses.

While a system managed by three businesses was given as an example in the above-described embodiment, the present invention can of course be applied to systems with four or more businesses.

Additionally, in the embodiment described above, the lowest communication frequency band B1 of the business B and the highest communication frequency band C4 of the business C were allotted to high power communications because they were non-adjacent frequency bands which were not adjacent to frequency bands of other businesses. However, it is possible to allocate these non-adjacent frequency bands B1 and C4 to low power communications in consideration of the possibility of introducing new businesses.

Second Embodiment

Various embodiments can be created according to the definitions of low power communication and high power communication in the above-described first embodiment.

In the present embodiment, low power communications mean the transmission of uplink transmission signals by low power mobile stations, and high power communications mean the transmission of uplink transmission signals by high power mobile stations.

Here, as examples which correspond to low power mobile stations, there are mobile phones for voice communication, and as examples which correspond to high power mobile stations, there are car mobile stations having high-speed data communication capabilities.

In the present embodiment, when a mobile station lies inside a certain cell, the base station of that cell or a mobile communication switching station at a higher level discriminates whether that mobile station is a high power mobile station or a low power mobile station. then, the base station or mobile communication, switching station preferentially allots the above-mentioned adjacent frequency bands as uplink channels for transmitting uplink transmission signals when the mobile station is a low power one, and preferentially uses the above-mentioned non-adjacent frequency bands when the mobile station is a high power one.

This type of frequency allocation method can be achieved, for example, by having a mobile station transmit information indicating the magnitude of the transmission output to the base station when a mobile station lies in a cell, such that the base station can determined the level of the transmission power of the mobile station based on this information.

Figure 3:
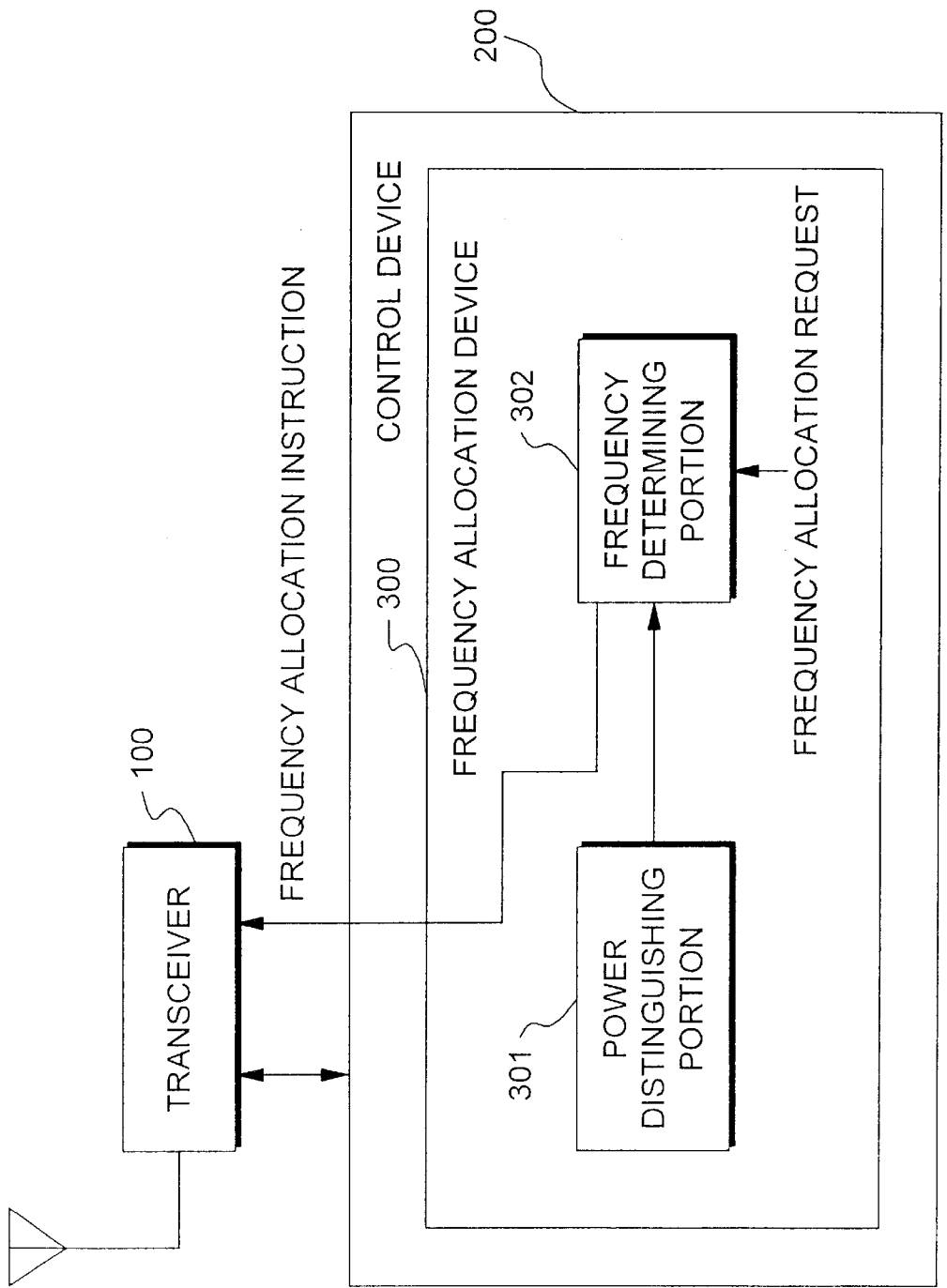
FIG. 3 is a block diagram showing the structure of a base station of a radio communication system according to a second embodiment of the present invention.

FIG. 3 shows the structure of a base station for achieving this frequency allocation method. This base station comprises a transceiver 100 for performing transmission and reception of radio signals with a mobile station, and a control device 200. Here, the control device 200 includes a device (not shown) for controlling each part of the base station including the transceiver 100, as well as a frequency allocation device 300 for allocating communication frequencies with respect to the mobile station. This frequency allocation device 300 includes a power distinguishing portion 301 and a frequency determining portion 302.

As described above, a mobile station which enters into the cell formed by this base station transmits information indicating the magnitude of the transmission power to the base station. This information is received by the transceiver 100 of the base station, and is supplied to the frequency allocation device 300. The power distinguishing portion 301 in the frequency allocation device 300 determines whether the mobile station is a high power mobile station or a low power mobile station based on the information received from the mobile station. Then, the frequency determining portion 302 determines a communication frequency band corresponding to the results of the determination by the power distinguishing portion 301, and sends the transceiver 100 a frequency allocation instruction to allocate the communication frequency band to that mobile station. The transceiver allots an uplink channel to the mobile station in accordance with these frequency allocation instructions. Aside from taking this type of allocation method, it is also possible to judge whether the mobile station is a high power mobile station or a low power mobile station based on mobile station information accumulated in a network database, and to allocate an uplink channel thereto according to the results of this judgment.

There are cases in which the traffic corresponding to mobile stations with low transmission powers becomes larger than the traffic corresponding to mobile stations with high transmission powers.

If the frequency allocation is performed by the method according to the present embodiment in such cases, the traffic on adjacent frequency bands will become heavy, and the traffic on non-adjacent frequency bands will become light.

However, if the traffic is light on the non-adjacent frequency bands and there is room to set up communication channels in the non-adjacent frequency bands, it is more desirable to allow use of the non-adjacent frequency bands without regard to the transmission power of the mobile station in order to prevent adjacent channel interference between businesses.

Therefore, in a preferable modification example of the present embodiment, if the traffic using non-adjacent frequency bands is light and there is room to set up communication channels in the non-adjacent frequency bands, then non-adjacent frequency bands are also allotted to mobile stations with low transmission powers.

Of course, in this method, the frequency allocation to mobile stations with higher transmission powers is given higher priority than to mobile stations with lower transmission powers when there is enough traffic of mobile stations with high transmission powers to fill up the non-adjacent frequency bands.

Figure 4:
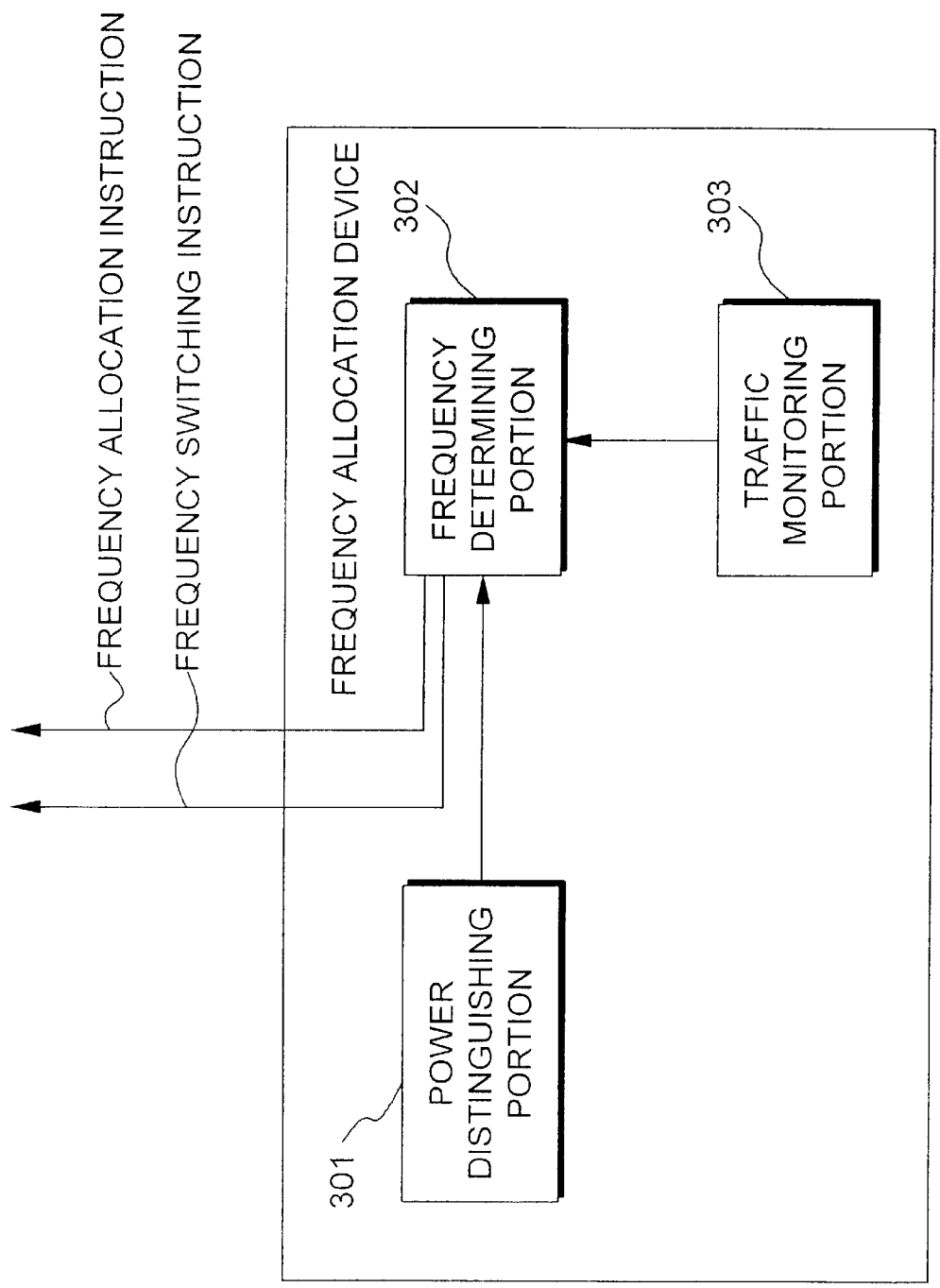
FIG. 4 is a block diagram showing the structure of a frequency allocation device according to a modification example of the same embodiment.

In order to achieve the frequency allocation method according to this modification example, the frequency allocation device shown in FIG. 4 is provided inside the control device in the base station. In this frequency allocation device, a traffic monitoring portion 303 is added to the frequency allocation device of FIG. 3 described above.

In this modification example, the system capacity of non-adjacent frequency bands is predetermined by means of methods such as simulations. Then, the percentage of the system capacity is predetermined as a threshold at which the frequency allocation control based on transmission power of mobile stations is started, and the threshold thus determined is preset in the frequency determining portion 302 in the frequency allocation device of each base station.

The traffic monitoring portion 303 monitors communication traffic performed via the transceiver of the base station, and determines the amount of traffic using each communication frequency band and reports this to the frequency determining portion 302 with respect to each communication frequency band.

The frequency determining portion 302 monitors the reports from this traffic monitoring portion 303. When the amount of traffic using the non-adjacent frequency bands is lower than the above-mentioned threshold value and a mobile station has newly entered the cell, the frequency determining portion 302 then sends the transceiver of the above-given FIG. 3 a frequency allocation instruction for allocating one of non-adjacent frequency bands without considering whether the mobile station is a mobile station with a high transmission power or a mobile station with a low transmission power. Thereafter, if the amount of traffic on the non-adjacent frequency bands exceeds the above-mentioned threshold value, the frequency determining portion 302 sends the transceiver of FIG. 3 a frequency switching instruction for changing the communication frequency band from the present frequency band to an adjacent frequency band with respect to mobile stations with low transmission powers which are using the non-adjacent frequency band. In accordance with these instructions, the transceiver performs procedures to modify the uplink channel frequency of the mobile station to an adjacent frequency band. Additionally, while the amount of traffic using non-adjacent frequency bands is above the above-mentioned threshold value, the frequency determining portion 302 performs a frequency allocation method wherein mobile stations with high transmission power are allotted non-adjacent frequency bands and mobile stations with low transmission powers are allotted adjacent frequency bands.

According to the above structure, non-adjacent frequency bands are allotted to the mobile stations regardless of the magnitude of the transmission power when the amount of traffic on the non-adjacent frequency bands is light, and the mobile stations are allotted communication frequency bands in accordance with the magnitudes of the transmission power when the amount of traffic on the non-adjacent frequency bands is heavy.

The amount of interference received by a base station will change according to the number of mobile stations connected to the base station.

Therefore, in order to enable appropriate frequency allocation to be performed in accordance with changes in the amount of interference, it is desirable to have a structure where the threshold value can be modified.

That is, the threshold value for judging the magnitude of traffic is made large when the number of mobile stations connected to a base station is small, and the threshold value is made small when the number of mobile stations connected to the base station is large.

Here, when the number of mobile stations connected to a base station is small, the threshold value is large, so that non-adjacent frequency bands are allotted to both high power mobile stations and low power mobile stations until the traffic on the non-adjacent frequency bands becomes very heavy, thus increasing the traffic on the non-adjacent frequency bands. However, this does not cause any problems because the amount of interference at the base station in this case is small.

On the other hand, if the number of mobile stations connected to a base station is large, then the threshold value is small, so that the mobile stations with low power are allotted and reallotted to the adjacent frequency bands at stages in which the traffic on the non-adjacent frequency bands is comparatively light.

When a large number of mobile stations are connected to the base station and the amount of interference in the base station is large in this way, the communication frequency bands used by each mobile station are appropriately divided into non-adjacent frequency bands and adjacent frequency bands, thereby reducing adverse effects on the base stations due to increases in the amount of interference.

While frequency allocation devices were provided in the base stations in the present embodiment and its modifications, it is also possible to provide the frequency allocation device in a network-side communication installation other than the base station. Additionally, the same shall hold true in cases in which the frequency allocation device is provided in other embodiments aside from the present embodiment.

Third Embodiment

In cellular radio communication systems, macrocells with relatively large cell radii are formed in regions with low traffic such as suburbs. On the other hand, in regions with heavy traffic such as in city centers, microcells with cell radii smaller than those of macrocells are formed in addition to the macrocells in order to absorb the traffic which cannot be sufficiently covered with the macrocells. Additionally, there are also cases wherein microcells are formed to cover gap portions which are not covered by the macrocells. The present embodiment is applied to a radio communication system having microcells and macrocells.

Figure 5:
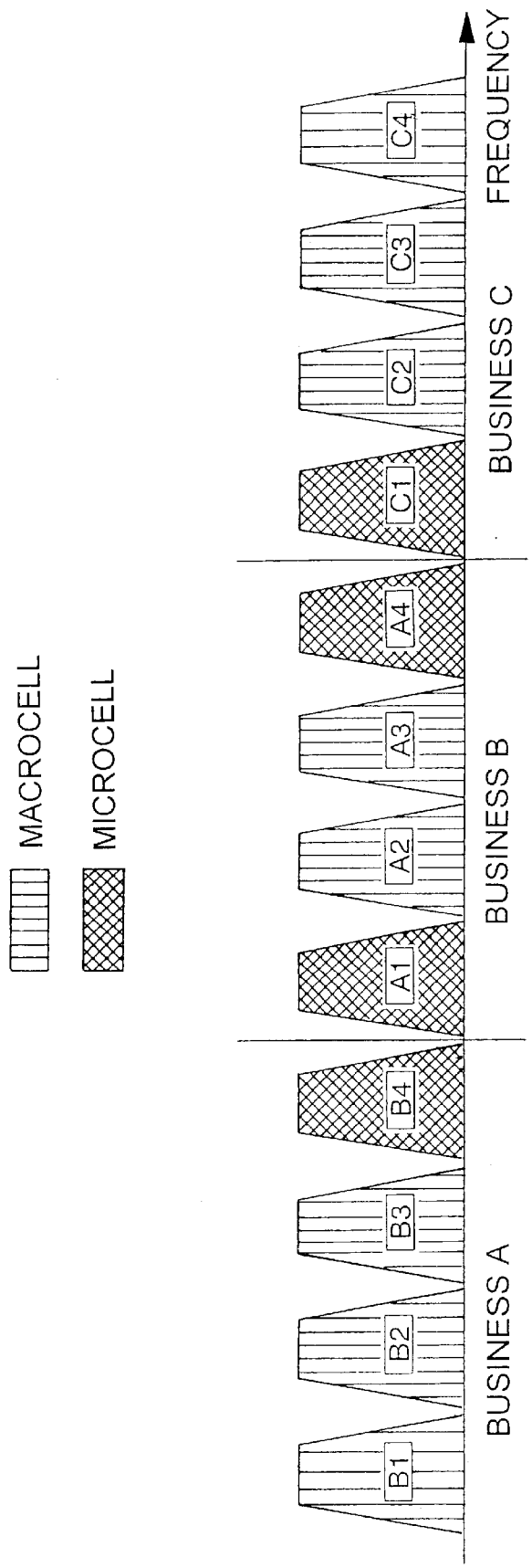
FIG. 5 is a diagram showing a frequency allocation method in a radio communication system according to a third embodiment of the present invention.
Figure 6:
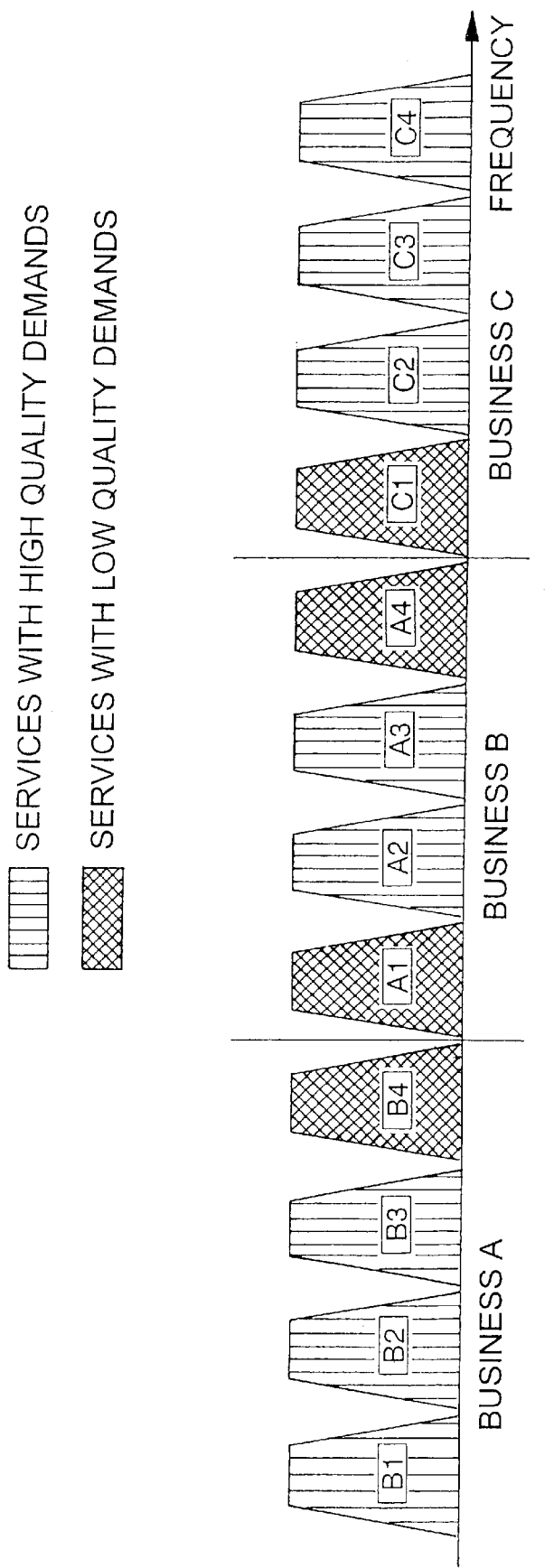
FIG. 6 is a diagram showing a frequency allocation method in a radio communication system according to a fourth embodiment of the present invention.
Figure 7:
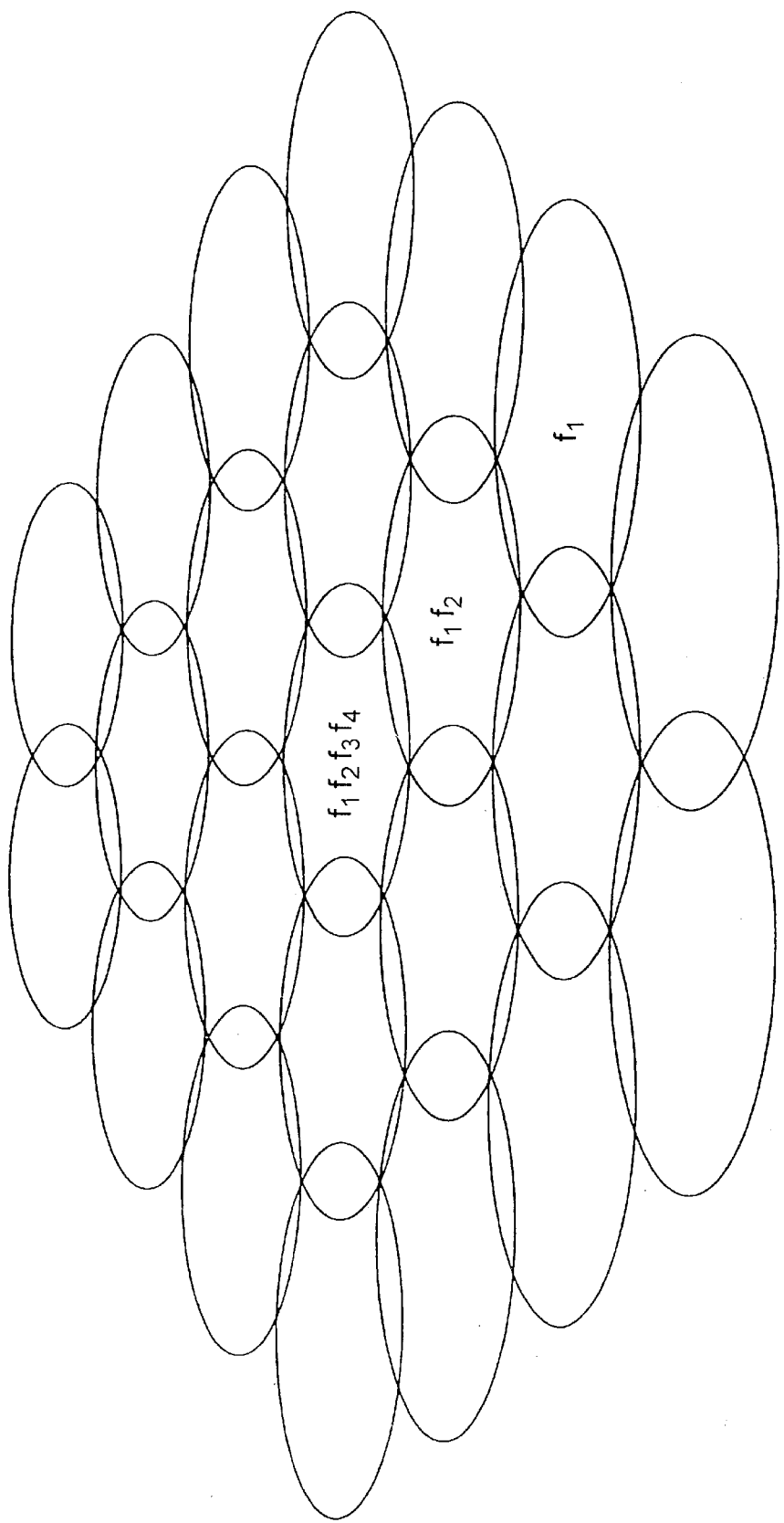
FIG. 7 is a diagram showing an example of a frequency arrangement in a cellular radio communication system.
Figure 8:
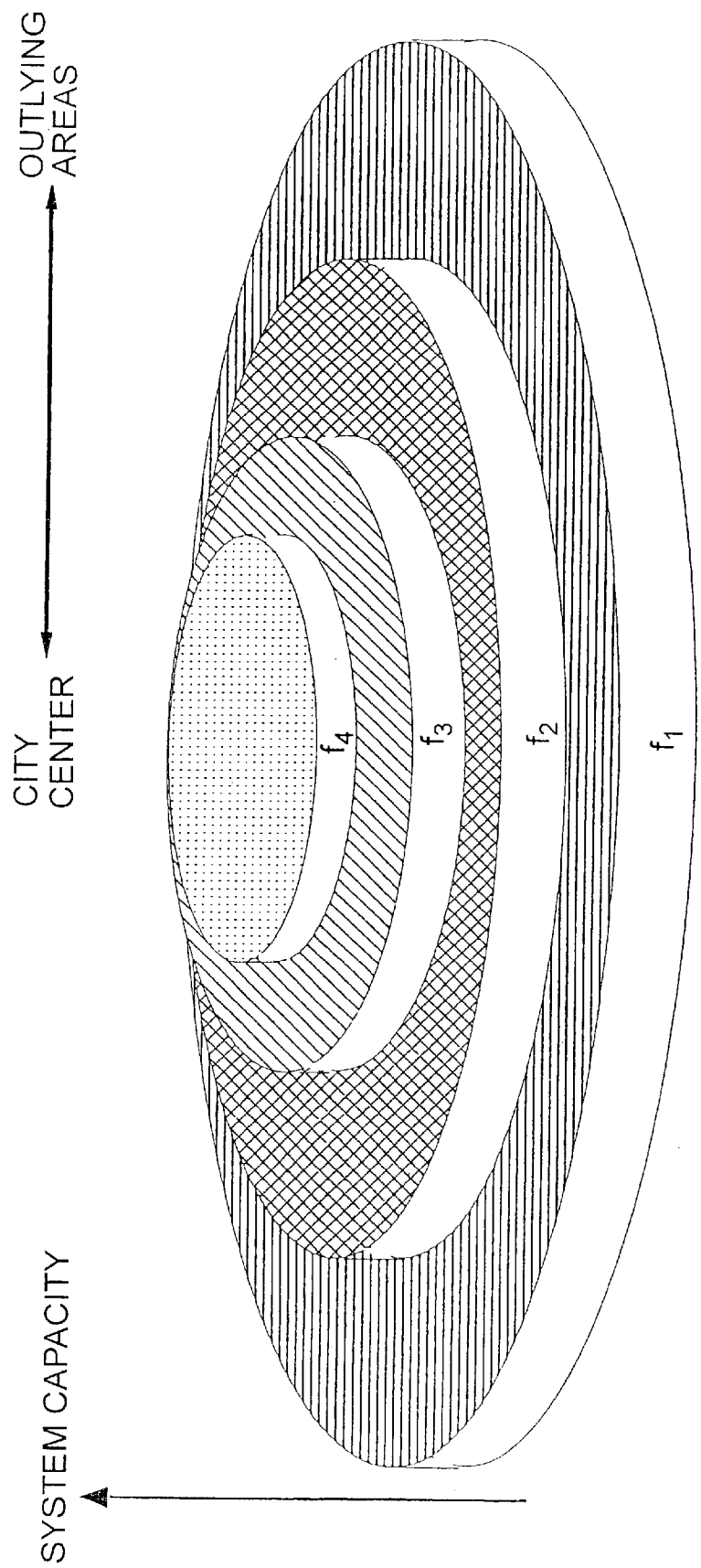
FIG. 8 is a diagram showing the relationship between frequency arrangement and system capacity in a cellular radio communication system.
Figure 9:
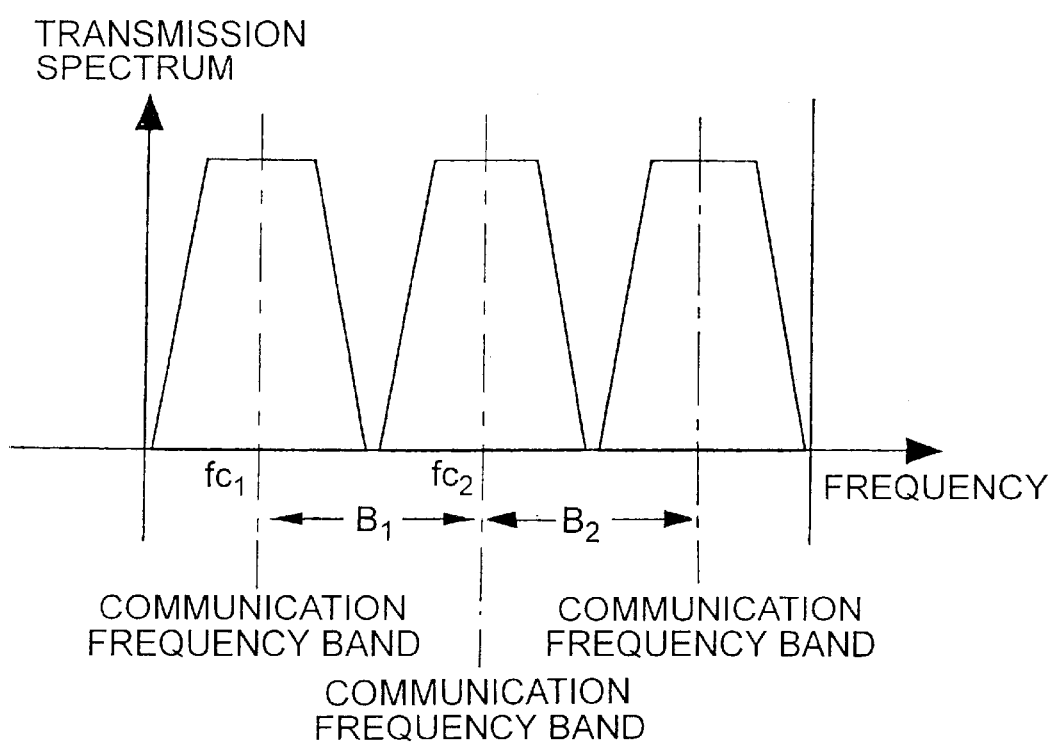
FIG. 9 is a diagram showing an example of a plurality of communication frequency bands provided in a frequency band for communication services.
Figure 10:
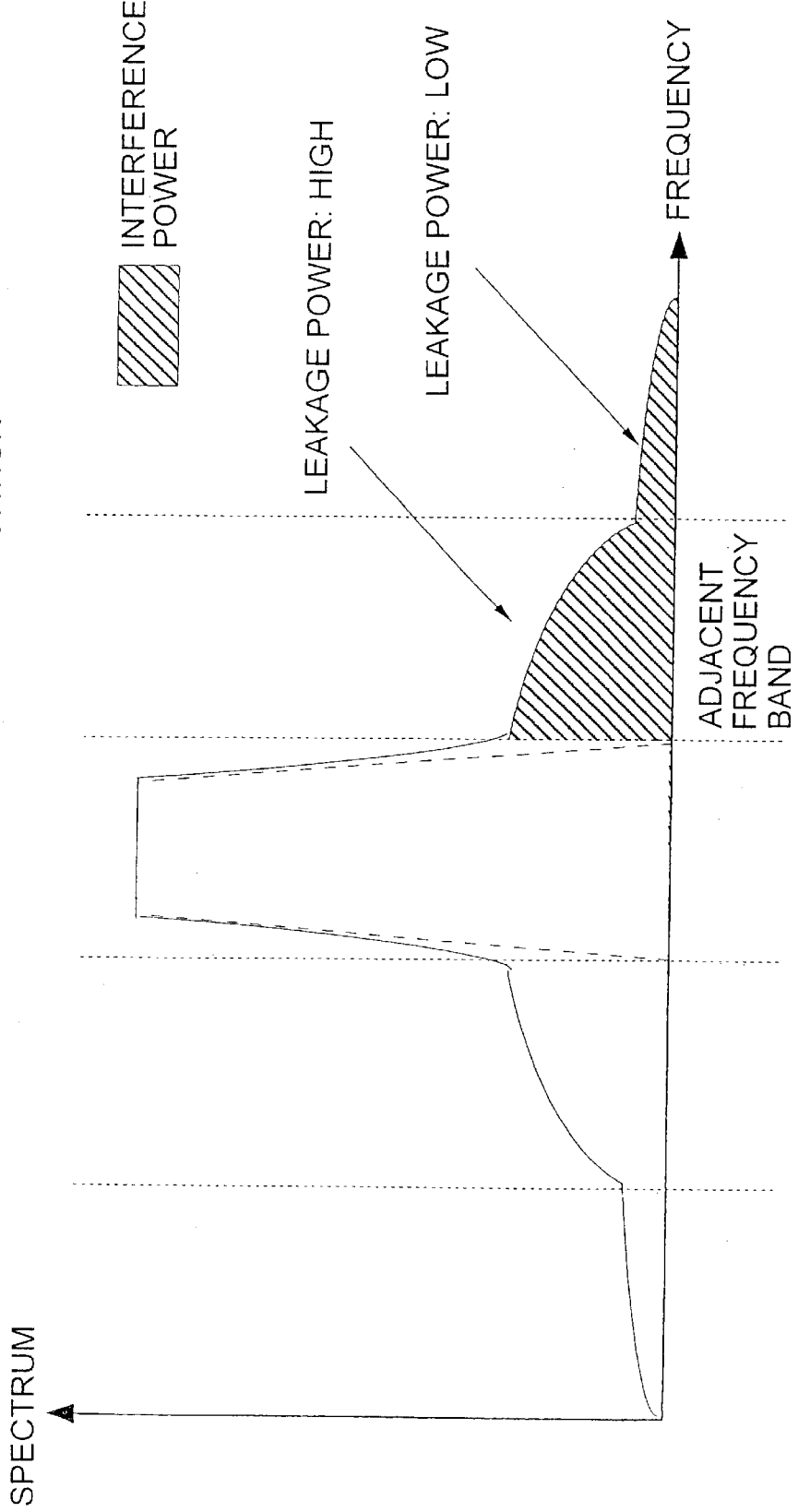
FIG. 10 is a diagram for explaining adjacent channel interference which occurs due to leakage signals during transmission.
Figure 11:
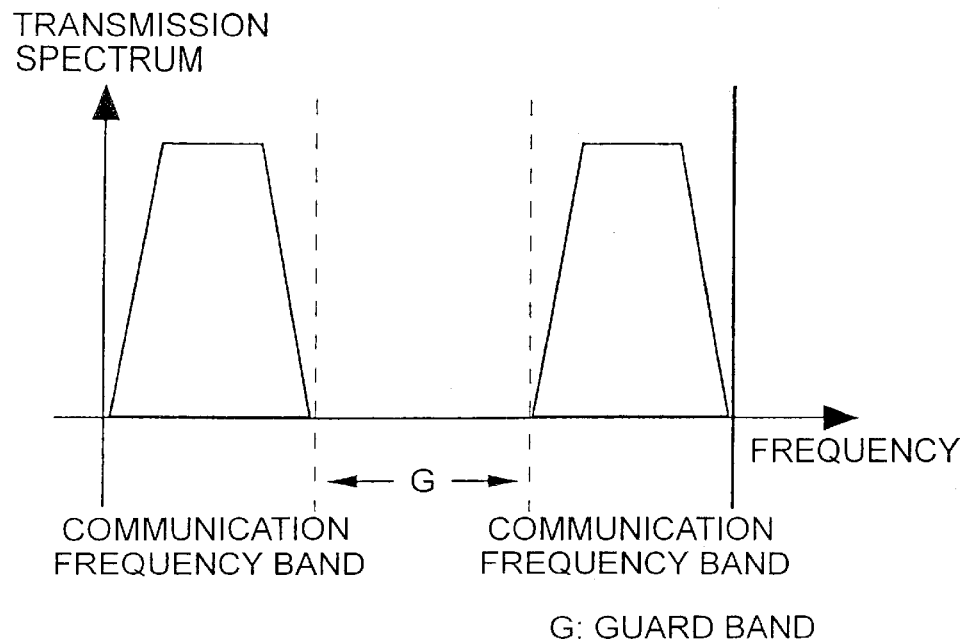
FIG. 11 is a diagram showing an example of a communication frequency band arrangement for a case where guard bands are provided for prevention of adjacent channel interference.
Figure 12:
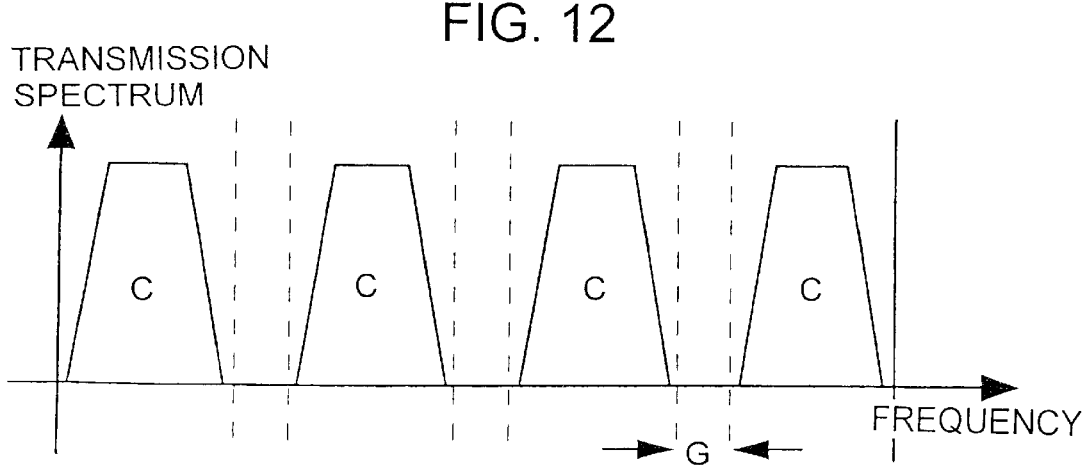
FIG. 12 is a diagram showing an example of a communication frequency band arrangement for a case where guard bands are made narrow.
Figure 13:
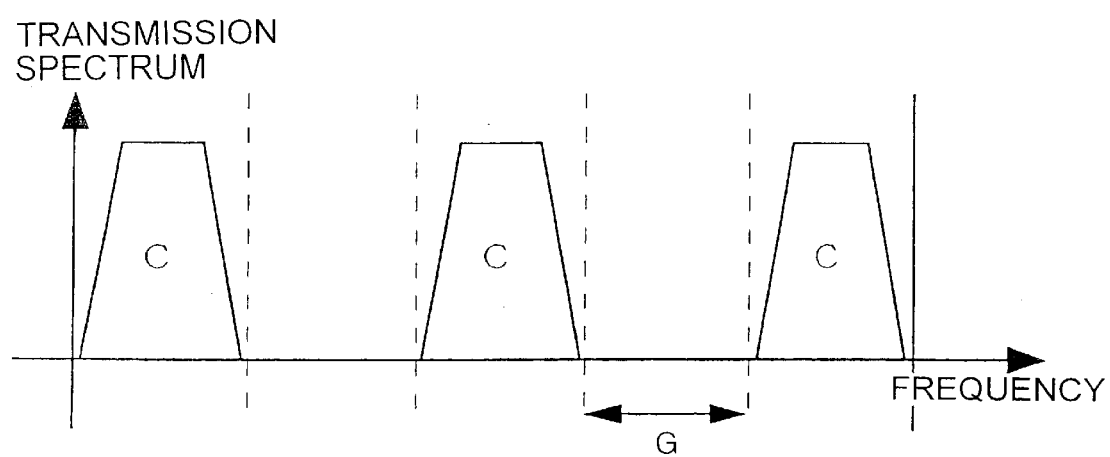
FIG. 13 is a diagram showing an example of a communication frequency band arrangement for a case where guard bands are made wide.
Figure 14:
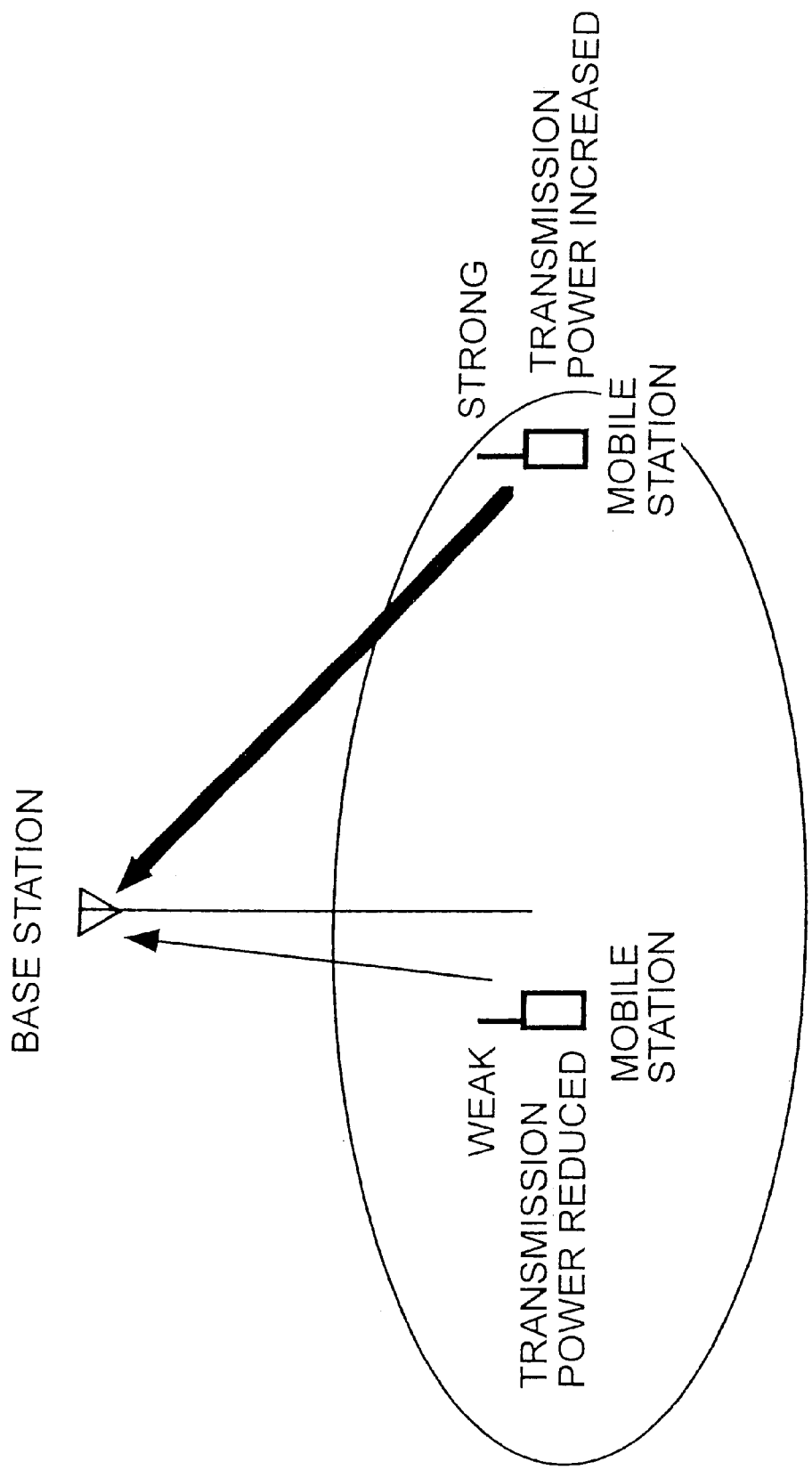
FIG. 14 is a diagram for explaining transmission power control performed for prevention of the effects of adjacent channel interference.
Figure 15A:
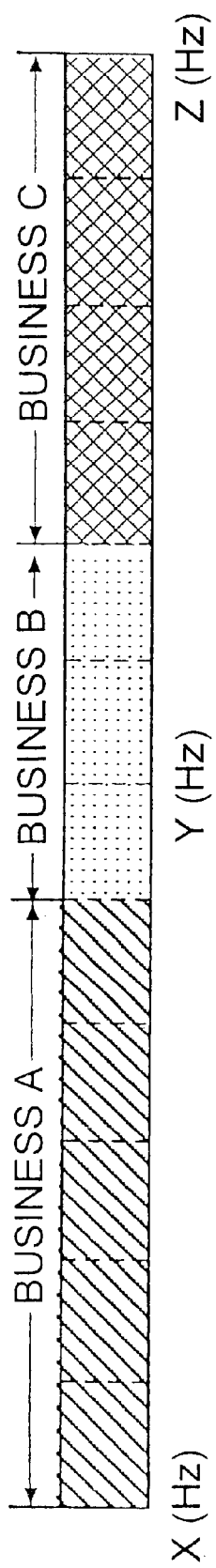
FIGS. 15A and 15B are diagrams showing examples of cases in which a plurality of businesses provide communication services; by being apportioned a single frequency band.
Figure 15B:
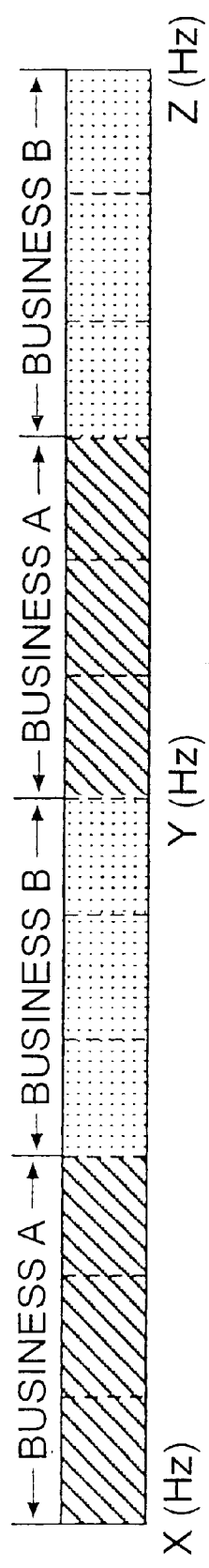

FIG. 5 shows a frequency allocation method according to the present embodiment. In the present embodiment, for example in the case of business A, the non-adjacent frequency bands A2 and A3 which are not adjacent to the frequency bands of the other businesses B and C among the communication frequency bands of this business A are used in macrocells, and the adjacent frequency bands A1 and A4 which are adjacent to the frequency bands of the other businesses B and C are used in microcells.

The same is true for the cases of businesses B and C, so that the adjacent frequency band B4 of the business B and the adjacent frequency band C1 of the business C are used in microcells, and the non-adjacent frequency bands B1, B2 and B3 of the business B and the nonadjacent frequency bands C2, C3 and C4 of the business C are used in macrocells.

Here, macrocells have cell radii of e.g. 1.5 km to several tens of km, and the uplink transmission power has a maximum of several W and the downlink transmission power has a maximum of several tens of W in the cells. Additionally, the microcells have cell radii of e.g. 100–300 m, and the downlink transmission power has a maximum of several mW to several tens of mW, and the downlink transmission power has a maximum of 10 mW to several hundred mW in the cells.

According to the present embodiment, since the transmission power of the microcell is operated at a lower power than that of the macrocells, it is possible to reduce the interference to adjacent channels due to leaked power.

Additionally, since the uplink transmission power of the mobile stations is low in the microcells, it is possible to make the amount of increase of the transmission power large when performing control to increase the transmission power in response to interference.

For this reason, there is the advantage that it is possible to readily handle interference between microcells between channels which are adjacent between businesses such as between the communication frequency bands A1 and B4, and between the communication frequency bands A4 and C1.

While systems operated by three businesses were given as examples in the above-described embodiments, the present invention is of course also applicable to systems operated by four or more businesses.

Additionally, in the embodiment described above, the lowest communication frequency band B1 in business B and the highest communication frequency band C4 in business C are non-adjacent frequency bands which are not adjacent to frequency bands of other businesses, and were therefore used in the macrocells. However, it is also possible to use these non-adjacent frequency bands B1 and C4 in microcells in consideration of the possibility of introduction of new businesses.

Fourth Embodiment

Next, a frequency allocation method, in a radio communication system according to a fourth embodiment of the present invention shall be explained.

Generally speaking, in voice communications in digital mobile communications, the voice data are compressed and sent at a low data rate so as not to obstruct bi-directional real-time conversation. Additionally, since a large code error occurs in digital mobile communications in comparison to wired communications, it is necessary to perform error correction coding on the compressed voice data. For this reason, the transmission quality, e.g. the values demanded for the code error rate must be set relatively weakly (e.g. BER (Bit Error Rate)=$1\times10^{-1}$).

Additionally, in packet communications, the data are divided into small blocks, and each block is transmitted via a radio channel, with retransmission control being performed when there is an error in a block. For this reason, when transmitting with a comparatively high error rate, or when an interruption occurs, no trouble occurs in the data transmission.

On the other hand, in digital data communications, services which ensure high-speed throughput are generally offered. For this reason, there are limitations on data compression and powerful error corrections which add large amounts of redundant data. Furthermore, when retransmission due to data errors such as packet transmissions during high-speed transmission of video data in applications such as TV conferences, the delay in the data transmission time largely fluctuates, so that the applications to use in bidirectional real-time applications such as TV conferences become difficult. Due to these types of reasons, the demands for transmission quality such as BER in digital data communications are strict.

Therefore, when offering services in the same service area, the maximum transmission power must be made larger in digital data communications than in voice communications or packet communications.

Thus, in the present embodiment, the adjacent frequency bands A1, A4, B4 and C1 which are adjacent to frequency bands allotted to other businesses among the communication frequency bands in the frequency bands allotted to each business are allotted to voice communications and packet communications in which the demands for transmission quality are low. In this case, the voice communication and packet communication channels are capable of being operated at low power, so as to enable the interference to the adjacent channels to be reduced.

On the other hand, of the communication frequency bands among the frequency bands allotted to each business, the non-adjacent frequency bands A2, A3, B1, B2, B3, C2, C3 and C4 which are not adjacent to the frequency bands of other businesses have little quality degradation due to interference.

For this reason, these non-adjacent frequency bands are allotted to high-speed and high-quality digital data communications which require high power.

Here, there are cases in which the traffic for voice communications and packet communications is larger than the traffic for digital data communications. In this type of case, the non-adjacent frequency bands should be allotted to voice communications and packet communications.

However, since digital data communications require high speeds and high quality due to the properties of the services, it is desirable to favor frequency allocation to digital data communications rather than voice communications and packet communications when there is sufficient digital data communication traffic to allocate to the non-adjacent frequency bands.

As specific methods for controlling frequency allocation, there are the following two methods.

(1) When the amount of data communication traffic is low, the non-adjacent frequency bands are allotted to voice communications and packet communications as well. When the amount of data communication traffic is large, the voice communications and packet communications which have already been allotted to the non-adjacent frequency bands are changed to allocation to adjacent frequency bands. Additionally, when the data communication traffic is heavy, newly initiated voice communications and packet communications are allotted adjacent frequency bands.

(2) All communications are first allotted non-adjacent frequency bands. After this allocation, if the data communication traffic is heavy, the allocation of the voice communications and packet communications are changed from non-adjacent frequency bands to adjacent frequency bands.

In order to achieve these types of frequency allocation methods, a frequency allocation device as per FIG. 4 should be provided in intra-network communication installations such as base stations or mobile communication switching stations. However, in this case, a device must be provided to determine the types of communications performed by mobile stations newly entering range instead of the power distinguishing portion 301, and the structure of the frequency determining portion 302 must be changed so that the communication frequency band allotted to the mobile stations according to the communication type as determined by the device will be chosen.

According to the present embodiment as described above, the transmission speed is low for voice communications and packet communications allotted adjacent frequency bands, so that the demanded quality is also low and the transmission power can be low as well. For this reason, when performing control to increase the transmission power in response to interference between businesses, the amount of increase can be made large, so that it is possible to respond to interference between channels which are adjacent between businesses such as between communication frequency bands A1 and B4 or between communication frequency bands A4 and C1 by increasing the output power.

Furthermore, during packet communications, leaked signals are sent out only when a packet is radio transmitted. Therefore, when an adjacent frequency band is allotted to packet communications as in the present embodiment, the probability of occurrence of adjacent channel interference can be reduced in comparison to cases of allocation to other types of communication.

In the embodiment described above, an example of a system operated by three businesses was given, but the present invention is of course also applicable to systems operated by four or more businesses.

Additionally, in the embodiments described above, the lowest communication frequency band B1 of the business B and the highest communication frequency band C4 of the business C are non-adjacent frequency bands which are not adjacent to the frequency bands of other businesses, and are allotted to data communications. However, when considering situations such as, for example, the introduction of new businesses, it is also possible to allocate these non-adjacent frequency bands B1 and C4 to voice communications and packet communications.

What is claimed is:

1. A frequency allocation method in a cellular radio communication system wherein a plurality of carriers share a predetermined frequency band, and each carrier provides radio communication services using respectively allotted frequency bands, comprising:

allotting within the frequency bands allotted to each carrier, adjacent frequency bands which are adjacent to frequency bands allotted to other carriers to low power communications, and non-adjacent frequency bands which are not adjacent to frequency bands allotted to other carriers to high power communications; and when among the frequency bands allotted to a carrier, the rate of use of said non-adjacent frequency bands is lower than a threshold value, allotting the non-adjacent frequency bands to communications regardless of whether they are high power communications or low power communications.

2. A frequency allocation method for a radio communication system according to claim 1, comprising:

allotting non-adjacent frequency bands to all communications which are initiated; and when the rate of use of the non-adjacent frequency bands becomes greater than or equal to the threshold value, re-allotting the adjacent frequency bands to communications which had already been allotted to non-adjacent frequency bands.

3. A frequency allocation method for a radio communication system according to claim 1, comprising switching said threshold value on the network side in response to traffic conditions.

* * * * *